United States Patent
Mazzillo et al.

(10) Patent No.: US 12,484,336 B2
(45) Date of Patent: Nov. 25, 2025

(54) INTEGRATED SEMICONDUCTOR OPTOELECTRONIC COMPONENT

(71) Applicant: ams-OSRAM International GmbH, Regensburg (DE)

(72) Inventors: Massimo Cataldo Mazzillo, Hamburg (DE); Daniel Dietze, Regensburg (DE)

(73) Assignee: ams-OSRAM International GmbH, Regensburg (DE)

( * ) Notice: Subject to any disclaimer, the term of this patent is extended or adjusted under 35 U.S.C. 154(b) by 551 days.

(21) Appl. No.: 17/797,882

(22) PCT Filed: Feb. 5, 2021

(86) PCT No.: PCT/EP2021/052818
§ 371 (c)(1),
(2) Date: Aug. 5, 2022

(87) PCT Pub. No.: WO2021/156445
PCT Pub. Date: Aug. 12, 2021

(65) Prior Publication Data
US 2023/0062921 A1    Mar. 2, 2023

(30) Foreign Application Priority Data
Feb. 6, 2020   (DE) ............... 10 2020 201 453.1

(51) Int. Cl.
*H10F 77/00*    (2025.01)
*G01S 7/481*    (2006.01)
(Continued)

(52) U.S. Cl.
CPC .......... *H10F 77/337* (2025.01); *G01S 7/4814* (2013.01); *G01S 7/4816* (2013.01);
(Continued)

(58) Field of Classification Search
None
See application file for complete search history.

(56) References Cited

U.S. PATENT DOCUMENTS

| 5,463,494 A | 10/1995 | Hobrock |
| 6,359,274 B1 * | 3/2002 | Nixon ............ H10F 30/21 |
| | | 250/215 |

(Continued)

FOREIGN PATENT DOCUMENTS

| CN | 101799324 A | 8/2010 |
| CN | 101853675 A | 10/2010 |

(Continued)

OTHER PUBLICATIONS

International Search Report issued for corresponding International Patent Application No. PCT/EP2021/052818 on May 18, 2021 (4 pages).

(Continued)

*Primary Examiner* — Benjamin P Sandvik
(74) *Attorney, Agent, or Firm* — Hauptman Ham, LLP

(57) ABSTRACT

An integrated semiconductor optoelectronic component for sensing ambient light levels includes a silicon photomultiplier configured to deliver an output signal indicative of the intensity of the light that irradiates the component. The silicon photomultiplier has an active surface area for light detection. The component also includes an optical filter covering the active surface area of the silicon photomultiplier. The optical filter is adapted to selectively transmit light onto the active surface area as a function of wavelength. The optical filter is a scotopic filter and has a spectral transmission curve that mimics the spectral response of the human eye under low-light conditions. The component further includes readout electronics for processing the output signal of the silicon photomultiplier.

12 Claims, 1 Drawing Sheet

(51) Int. Cl.
  *G01S 7/4865* (2020.01)
  *G01S 17/894* (2020.01)
  *G02B 5/20* (2006.01)
  *G02B 27/14* (2006.01)
  *H10F 30/21* (2025.01)
  *H10F 30/225* (2025.01)
  *H10F 77/30* (2025.01)
  *G02B 5/28* (2006.01)

(52) U.S. Cl.
  CPC .......... *G01S 7/4817* (2013.01); *G01S 7/4865* (2013.01); *G01S 17/894* (2020.01); *G02B 5/207* (2013.01); *G02B 5/208* (2013.01); *G02B 27/14* (2013.01); *H10F 30/225* (2025.01); *H10F 30/288* (2025.01); *H10F 77/331* (2025.01); *H10F 77/959* (2025.01); *G02B 5/28* (2013.01)

(56) References Cited

U.S. PATENT DOCUMENTS

| | | | |
|---|---|---|---|
| 2002/0100865 A1 | 8/2002 | Nixon et al. | |
| 2008/0088722 A1* | 4/2008 | Takeichi | H10F 77/50 257/E31.118 |
| 2008/0179701 A1 | 7/2008 | Lin et al. | |
| 2008/0191298 A1* | 8/2008 | Lin | H10F 39/8053 257/E21.705 |
| 2011/0068255 A1 | 3/2011 | Zheng et al. | |
| 2012/0313201 A1 | 12/2012 | Hebert et al. | |
| 2013/0112855 A1 | 5/2013 | McLeod | |
| 2014/0168761 A1* | 6/2014 | Ockenfuss | G02B 5/283 359/360 |
| 2015/0116672 A1 | 4/2015 | Woltman et al. | |
| 2015/0181662 A1 | 6/2015 | Ghoshal | |
| 2016/0141322 A1* | 5/2016 | Gokingco | G01J 1/0488 257/432 |
| 2018/0027196 A1 | 1/2018 | Yang et al. | |
| 2018/0308881 A1 | 10/2018 | Hynecek | |
| 2018/0364095 A1 | 12/2018 | Nagaya et al. | |
| 2019/0320128 A1 | 10/2019 | Lee | |

FOREIGN PATENT DOCUMENTS

| | | |
|---|---|---|
| CN | 102331298 A | 1/2012 |
| CN | 103884696 A | 6/2014 |
| CN | 104301647 A | 1/2015 |
| CN | 105683807 A | 6/2016 |
| CN | 105895645 A | 8/2016 |
| CN | 107885023 A | 4/2018 |
| CN | 108227059 A | 6/2018 |
| CN | 108414083 A | 8/2018 |
| EP | 2 407 760 A1 | 1/2012 |
| EP | 3 301 509 A1 | 4/2018 |
| WO | 2017/172030 A1 | 10/2017 |

OTHER PUBLICATIONS

Written Opinion issued for corresponding International Patent Application No. PCT/EP2021/052818 on May 18, 2021 (5 pages).

Sengupta et al., "An All-Digital CMOS Ambient Light Sensor using a Single Photon Avalanche Diode", 2017 IEEE Sensors, Oct. 29, 2017, pp. 1-3 (3 pages).

Zhu et al., "Fluorescence Multiplexing with Time-Resolved and Spectral Discrimination Using a Near-IR Detector", Analytical Chemistry, vol. 75, No. 10, May 15, 2003, pp. 2280-2291 (12 pages).

Yongjie Jin et al., "Nuclear Medicine Instruments and Methods", Harbin Engineering University Press, Jan. 2010, 4 pages, see p. 4, lines 33-38 of the English translation in NPL No. 3, cited in NPL No. 3.

Yinqiao Xia et al., "Sensor Technology and Applications", XHuazhong University of Science and Technology Press, with it's English Machine translation, Feb. 2011, 12 pages, cited in NPL No. 3.

Chinese Office Action issued on Sep. 18, 2025, for corresponding Chinese Patent Application No. 202180013382.X, with its English Machine translation, 13 pages.

* cited by examiner

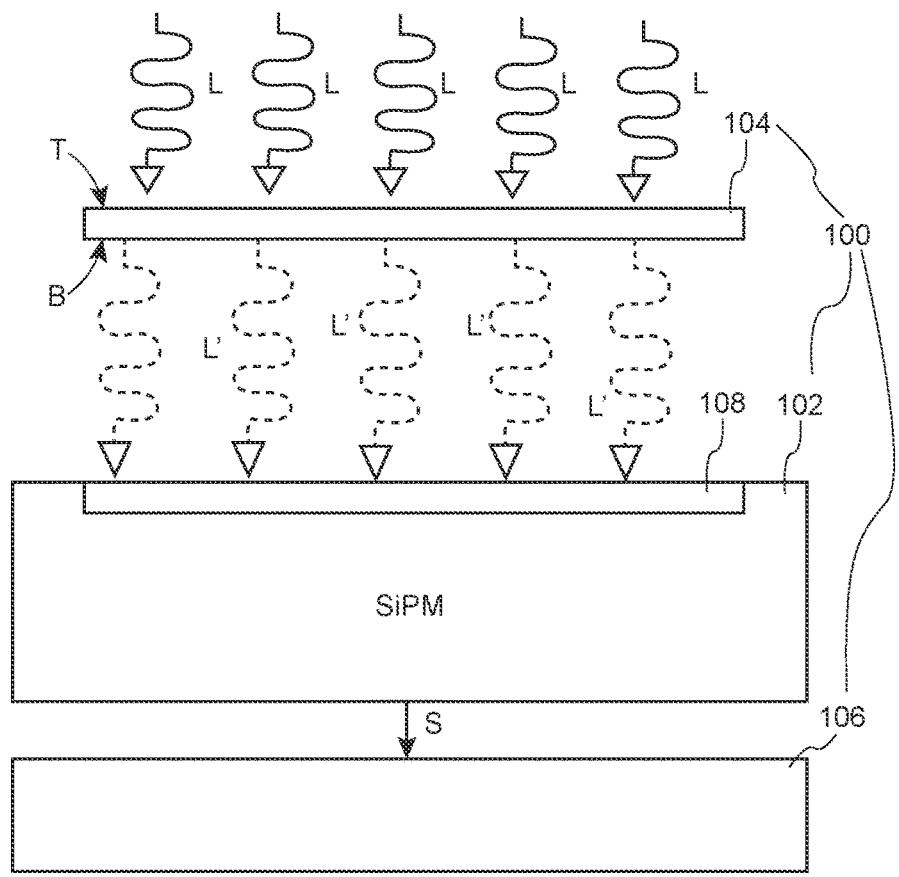
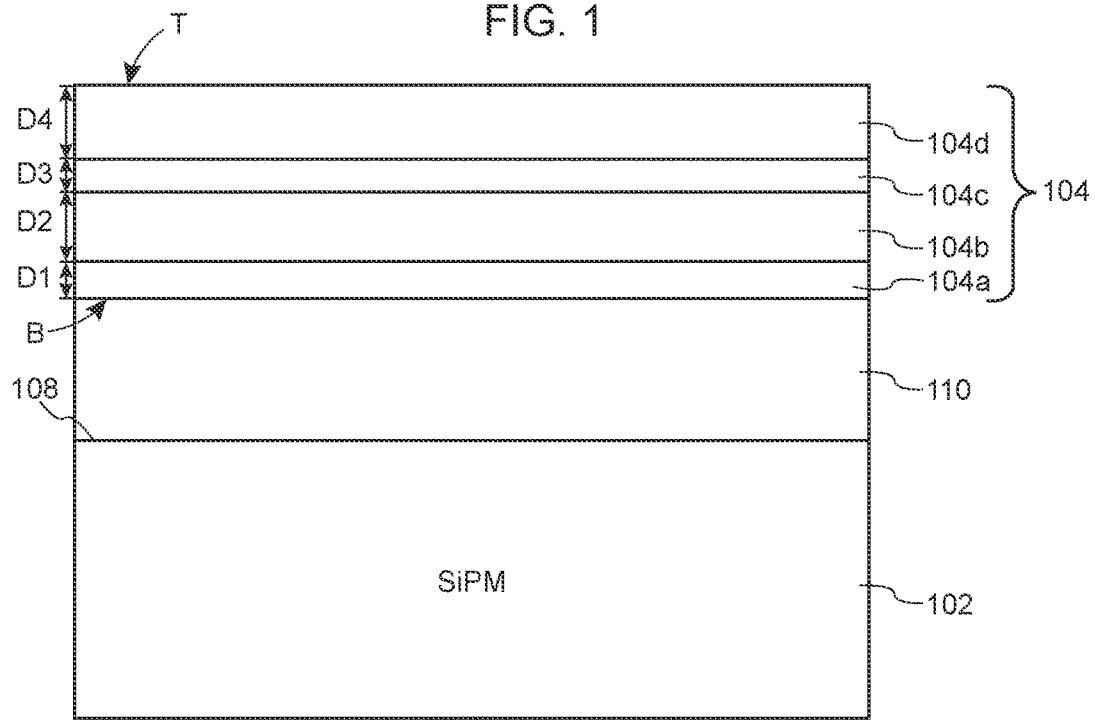

INTEGRATED SEMICONDUCTOR OPTOELECTRONIC COMPONENT

CROSS REFERENCE TO RELATED APPLICATION

This application is a National Stage of International Application No. PCT/EP2021/052818, filed on Feb. 5, 2021, which designates the United States and was published in Europe, and which is based upon and claims priority to German Patent Application No. 10 2020 201 453.1, filed on Feb. 6, 2020 in the German Patent Office. Both of the aforementioned applications are hereby incorporated by reference in their entireties.

The present disclosure pertains to particular semiconductor optoelectronic components known as ambient light sensors. These components typically have dimensions in the millimetre range. They can be built into electronic devices such as smart phones, notebooks, displays and the like. Their purpose is to sense the amount of light present in the environment of the electronic device into which they are integrated. The output signal of the ambient light sensor can be used to adapt the device's operation to the current ambient light conditions.

Conventional ambient light sensors are typically designed to reliably detect ambient light with an illuminance in the range of between a few lux up to $10^5$ lux. Below a few lux, with decreasing illuminance, and in particular below 0.1 lux, the measurement accuracy of a conventional ambient light sensor deteriorates considerably. The spectral response of a conventional ambient light sensor is made to mimic the spectral response of the human eye in daylight as defined by the photopic luminosity function.

Accordingly, conventional ambient light sensors are not well suited for measuring ambient light levels in a dark environment, e.g. during the night.

In the present disclosure, a dark environment, or, in other words, low-light conditions, is to be understood as an environment where the illuminance of the ambient light is below 0.1 lux. 0.1 lux is the maximum ambient light level that can be expected in a clear night with a full moon.

It is thus an object of the present disclosure to provide a semiconductor optoelectronic component for sensing ambient light levels, which can accurately measure the intensity of ambient light under low-light conditions, and preferably down to the level of individual photons.

According to the present disclosure, this object is achieved with an integrated semiconductor optoelectronic component for sensing ambient light levels, the component comprising a silicon photomultiplier configured to deliver an output signal indicative of the intensity of the light that irradiates the component, the silicon photomultiplier having an active surface area for light detection, an optical filter covering the active surface area of the silicon photomultiplier, the optical filter being adapted to selectively transmit light onto the active surface area as a function of wavelength, wherein the optical filter is a scotopic filter and thus has a spectral transmission curve that mimics the spectral response of the human eye under low-light conditions, and readout electronics for processing the output signal of the silicon photomultiplier.

This new and innovative ambient light sensor design with a silicon photomultiplier and a scotopic filter is particularly adapted to detection in dark environments. The silicon photomultiplier ensures a large gain and single photon sensitivity, which are needed to capture low photon fluxes with accuracy. The scotopic filter has the effect that the spectral response of the ambient light sensor is similar to the human eye.

According to preferred embodiments, the optoelectronic component of the present disclosure has one, several or all of the following features, in all technically possible combinations:
- the optical filter is a stack of metallic and dielectric layers;
- the metallic and dielectric layers of the stack are stacked in an alternating fashion;
- the optical filter has a bottom side proximate to the active surface area of the silicon photomultiplier, and a top side opposite to the bottom side, wherein the bottom side is formed by a metallic layer, and wherein the top side is formed by a dielectric layer;
- the optical filter consists of a total of four stacked layers;
- the material of each metallic layer is silver;
- the material of each dielectric layer is silicon dioxide;
- the thickness of a metallic layer is around 15% of the thickness of a dielectric layer;
- a dielectric stack is arranged between the optical filter and the active surface area of the silicon photomultiplier;
- the readout electronics includes digital circuitry, such as a discriminator and/or a counter;
- the component is an ambient light sensor;
- an additional silicon photomultiplier configured to deliver an output signal indicative of the intensity of the light that irradiates the component, the additional silicon photomultiplier having an active surface area for light detection, and an additional optical filter covering the active surface area of the additional silicon photomultiplier, the additional optical filter being adapted to selectively transmit light onto the active surface area as a function of wavelength, wherein the additional optical filter is a photopic filter and thus has a spectral transmission curve that mimics the spectral response of the human eye in daylight.

An exemplary embodiment of the present disclosure will now be described in detail with reference to the accompanying drawings, in which:

FIG. 1 is a schematic exploded view of an optoelectronic component according to the present disclosure, in the form of an ambient light sensor; and FIG. 2 is an illustration showing the layered structure of the scotopic optical filter of the optoelectronic component of FIG. 1.

With reference to FIG. 1, there is shown an integrated semiconductor optoelectronic component 100. The optoelectronic component 100 is an ambient light sensor, which is specifically designed to accurately measure ambient light levels under low-light conditions.

The ambient light sensor 100 may be built into various electronic devices so that the operation of these devices may be controlled as a function of the intensity of the background light of the device's environment. For example, the ambient light sensor 100 may be integrated into a smart phone. The brightness of the smart phone's display may then be adjusted as a function of the measurement signal delivered by the ambient light sensor 100.

The ambient light sensor 100 comprises a silicon photomultiplier (SiPM) 102, an optical filter 104, and readout electronics 106.

The silicon photomultiplier 102 is configured to deliver an output signal S indicative of the intensity of the light L that irradiates the component 100. The silicon photomultiplier 102 has an active surface area 108 for light detection. Silicon photomultiplier 102 may be of a standard type known to the one skilled in the art. Preferably, the SiPM 102 is of the passive quenching type, i.e. each of its single photon avalanche diode (SPAD) cells is connected in series with a passive quenching resistor. The advantage of a passive quenching SiPM is that its output signal S has an approximately logarithmic behaviour. A logarithmic output is generally preferred for ambient light sensors.

The readout electronics 106 may include digital circuitry, such as a discriminator and/or a counter for processing the output signal S of the silicon photomultiplier 102.

The optical filter 104 covers the active surface area 108 of the silicon photomultiplier 102. The optical filter 104 is adapted to selectively transmit light onto the active surface area 108 as a function of wavelength. The optical filter 104 is a scotopic filter and thus has a spectral transmission curve that mimics the spectral response of the human eye under low-light conditions. In FIG. 1, the filtering action of the scotopic filter 104 is indicated by the dashed wavy arrows L'.

The scotopic filter 104 has a bottom side B proximate to the active surface area 108 of the silicon photomultiplier 102, and a top side T opposite to the bottom side B.

A preferred structure of the scotopic filter 104 is shown in FIG. 2. In this case, the scotopic filter 104 is a stack of metallic layers 104a, 104c and of dielectric layers 104b, 104d. The metallic and dielectric layers of the stack 104 are stacked in an alternating fashion: a bottom metallic layer 104a is covered by an intermediate dielectric layer 104b, which is covered by an intermediate metallic layer 104c, which is covered by a top dielectric layer 104d. One will note that the bottom side B of the scotopic filter 104 is formed by the bottom metallic layer 104a. The top side T of the scotopic filter 104 is formed by the top dielectric layer 104d. In the present example, the scotopic filter 104 consists of a total of four stacked layers.

Preferably, the material of both metallic layers 104a and 104c is silver. The material of both dielectric layers 104b and 104d may be silicon dioxide.

An exemplary value for the thickness D of each layer is given in the table below:

| Layer | Material | Thickness |
| --- | --- | --- |
| Bottom metallic layer 104a | Ag | D1 = 18 nm |
| Intermediate dielectric layer 104b | SiO2 | D2 = 115 nm |
| Intermediate metallic layer 104c | Ag | D3 = 18 nm |
| Top dielectric layer 104d | SiO2 | D4 = 125 nm |

More generally, the thickness of a metallic layer 104a, 104c may be around 15% of the thickness of a dielectric layer 104b, 104d.

Optionally, and as shown in FIG. 2, the ambient light sensor 100 may also include a dielectric stack 110 arranged between the optical filter 104 and the active surface area 108 of the silicon photomultiplier 102. The dielectric stack 110 may be an oxide stack and may have a thickness of a few microns.

The present disclosure provides an ambient light sensor operating with single photon sensitivity down to very low photon fluxes (0.01 lux or even less).

The ambient light sensor also has an enhanced dynamic operating range (it may cover more than five orders of magnitude of illuminance) compared to conventional solutions.

Thanks to its SiPM, it has a response curve that is approximately logarithmic, with high sensitivity for very low photon fluxes and a decreased sensitivity for higher photon fluxes.

Furthermore, the present ambient light sensor benefits from the very fast timing response and the intrinsic gain of its SiPM. This simplifies the readout electronics, which does not require any signal amplifier.

In a further embodiment of the present disclosure, the optoelectronic component for sensing ambient light levels may comprise an additional silicon photomultiplier whose active surface area is covered by an additional photopic optical filter. This embodiment is optimised for the detection of ambient light levels under mesopic conditions. The output signals of both SiPMs can be combined to obtain a more accurate measurement of the ambient light level in a mesopic environment such as a dimly lit tunnel or a poorly lit street. In such an application, one may for example use the ratio of both output signals.

Both SiPMs may be shielded by an attenuating filter to avoid saturation. Each attenuating filter may be implemented as a patterned metal layer. The attenuating filter for the SiPM that is covered by the photopic filter may have a lower fractional transmittance than the attenuating filter for the SiPM that is covered by the scotopic filter.

The invention claimed is:

1. An integrated semiconductor optoelectronic component for sensing ambient light levels, the component comprising:
   a silicon photomultiplier configured to deliver an output signal indicative of the intensity of the light that irradiates the component, the silicon photomultiplier having an active surface area for light detection;
   an optical filter covering the active surface area of the silicon photomultiplier, the optical filter being adapted to selectively transmit light onto the active surface area as a function of wavelength, wherein the optical filter is a scotopic filter and has a spectral transmission curve that mimics the spectral response of the human eye under low-light conditions; and
   readout electronics for processing the output signal of the silicon photomultiplier.

2. The component of claim 1, wherein the optical filter is a stack of metallic and dielectric layers.

3. The component of claim 2, wherein the metallic and dielectric layers of the stack are stacked in an alternating fashion.

4. The component of claim 2, wherein the optical filter has a bottom side proximate to the active surface area of the silicon photomultiplier, and a top side opposite to the bottom side, wherein the bottom side is formed by a metallic layer, and wherein the top side is formed by a dielectric layer.

5. The component of claim 2, wherein the optical filter consists of a total of four stacked layers.

6. The component of claim 2, wherein the material of each metallic layer is silver.

7. The component of claim 2, wherein the material of each dielectric layer is silicon dioxide.

8. The component of claim 2, wherein the thickness of a metallic layer is around 15% of the thickness of a dielectric layer.

9. The component of claim 1, wherein a dielectric stack is arranged between the optical filter and the active surface area of the silicon photomultiplier.

10. The component of claim 1, wherein the readout electronics includes digital circuitry, such as a discriminator and/or a counter.

11. The component of claim 1, wherein the component is an ambient light sensor.

12. The component of claim 1, further comprising:
    an additional silicon photomultiplier configured to deliver an output signal indicative of the intensity of the light that irradiates the component, the additional silicon photomultiplier having an active surface area for light detection; and an additional optical filter covering the active surface area of the additional silicon photomultiplier, the additional optical filter being adapted to selectively transmit light onto the active surface area as a function of wavelength, wherein the additional optical filter is a photopic filter and thus has a spectral transmission curve that mimics the spectral response of the human eye in daylight.

\* \* \* \* \*